United States Patent [19]
Wilmonti

[11] 4,074,264
[45] Feb. 14, 1978

[54] ADAPTIVE THRESHOLD CLUTTER PROCESSOR

[75] Inventor: Richard D. Wilmont, Buena Park, Calif.

[73] Assignee: Hughes Aircraft Company, Culver City, Calif.

[21] Appl. No.: 647,226

[22] Filed: Jan. 7, 1976

[51] Int. Cl.$^2$ ............................ G01S 7/30; G01S 9/02
[52] U.S. Cl. .............................. 343/17.1 R; 343/5 DP
[58] Field of Search ....................... 343/17.1 R, 5 DP

[56] References Cited
U.S. PATENT DOCUMENTS

| | | | |
|---|---|---|---|
| 3,531,802 | 9/1970 | Brown et al. | 343/17.1 R |
| 3,946,382 | 3/1976 | Kossiakoff et al. | 343/5 DP |

Primary Examiner—T.H. Tubbesing
Assistant Examiner—Richard E. Berger
Attorney, Agent, or Firm—Walter J. Adam; William H. MacAllister

[57] ABSTRACT

A time sampling adaptive clutter processor that samples on a scan to scan basis rather than on an area basis and in response to signals received from the object being interrogated develops a mean level value and a standard deviation value. The mean value and the standard deviation value may be provided by recursive type filters operating with scan to scan memories. The mean level value is then combined with the standard deviation value to provide a threshold that provides improved clutter detection especially with a condition in which a clutter variation from scan to scan is less than the clutter variation between areas in any one scan. The system may also include a valid target control to eliminate the detrimental effects on the threshold that may be caused by targets being tracked.

10 Claims, 10 Drawing Figures

ADAPTIVE THRESHOLD CLUTTER PROCESSOR

BACKGROUND OF THE INVENTION

1. Field of the Invention

This invention relates to improved clutter processors for the detection of objects such as radar targets and particularly to a detection arrangement that utilizes an adaptive threshold based on time samples instead of space samples.

2. Description of the Prior Art

Conventionally, adaptive radar clutter thresholding devices sample clutter video from different positions in space, area or range. These clutter video samples are averaged to estimate the mean value and the threshold is based on the multiple of the sample mean. The widely used mean level detector utilizes this technique to establish an adaptive detection threshold in radar clutter video which gives good performance and a constant false alarm rate for clutter with a Rayleigh probability density function. Thus, for example the mean level detector is effective in sea clutter but in the presence of ground clutter, which is not Rayleigh distributed and contains many high amplitude clutter returns, the threshold is raised and the detection sensitivity is decreased. Various types of clutter discrimination techniques include manual rejection of clutter on a selected area basis, automatic rejection of stationary clutter based on scan to scan correlation in a digital clutter map and use of a track while scan function to track clutter returns and reject them based on a velocity criterion. All of these methods have limitations in the presence of certain type of clutter conditions with manual rejection placing a heavy work load on an operator for dynamic clutter environments, automatic clutter mapping having limitations against scintillating or fading clutter and clutter tracking being vulnerable to saturation of the computer time and core capacity when operating in high density clutter. A detector system that is relatively insensitive to the presence of rapidly changing high clutter amplitude peaks would be of a substantial advantage to the art especially in the presence of ground clutter.

SUMMARY OF THE INVENTION

Briefly, the system of this invention responds to input signals which may be radar video quantized and integrated in azimuth and is then applied in parallel to a mean value processor and a standard deviation determining circuit each of which may include a recursive filter for providing smoothing. The recursive filters are utilized to estimate the mean and the mean squared values by performing a scan to scan exponentially weighted filtering function. The standard deviation is developed by properly combining the mean square value and the square of the mean value. The threshold is then obtained by combining the selected constants, the mean value and the standard deviation value which is then compared with the on time value from the azimuth integrator to declare a detection if the integrated video exceeds the threshold. In one arrangement in accordance with the principles of the invention, in order to prevent strong valid targets from affecting the threshold, the integrated video that occurs during the presence of a target is inhibited from affecting the time integrated value of the threshold.

OBJECT OF THE INVENTION

It is therefore an object of this invention to provide an improved clutter processor for the detection of targets in non-homogeneous clutter conditions.

It is another object of this invention to provide a target detection system that operates satisfactorily in the presence of clutter that is not Rayleigh distributed.

It is a still further object of this invention to provide a detection system that provides a high degree of sensitivity when operating in a clutter condition in which many high amplitude returns are present that would raise the threshold in a conventional mean level detector and reduce the detection sensitivity.

It is still another object of this invention to provide an improved object detection system that provides a high degree of sensitivity when the scan to scan amplitude variation of the clutter is less than the variation from range bin to range bin.

BRIEF DESCRIPTION OF THE DRAWINGS

The novel features of this invention as well as the invention itself both as to its organization and method of operation, will best be understood from the accompanying drawings, taken in connection with the accompanying description, in which like reference characters refer to like parts and in which.

DESCRIPTION OF THE PREFERRED EMBODIMENT

Figure 1:
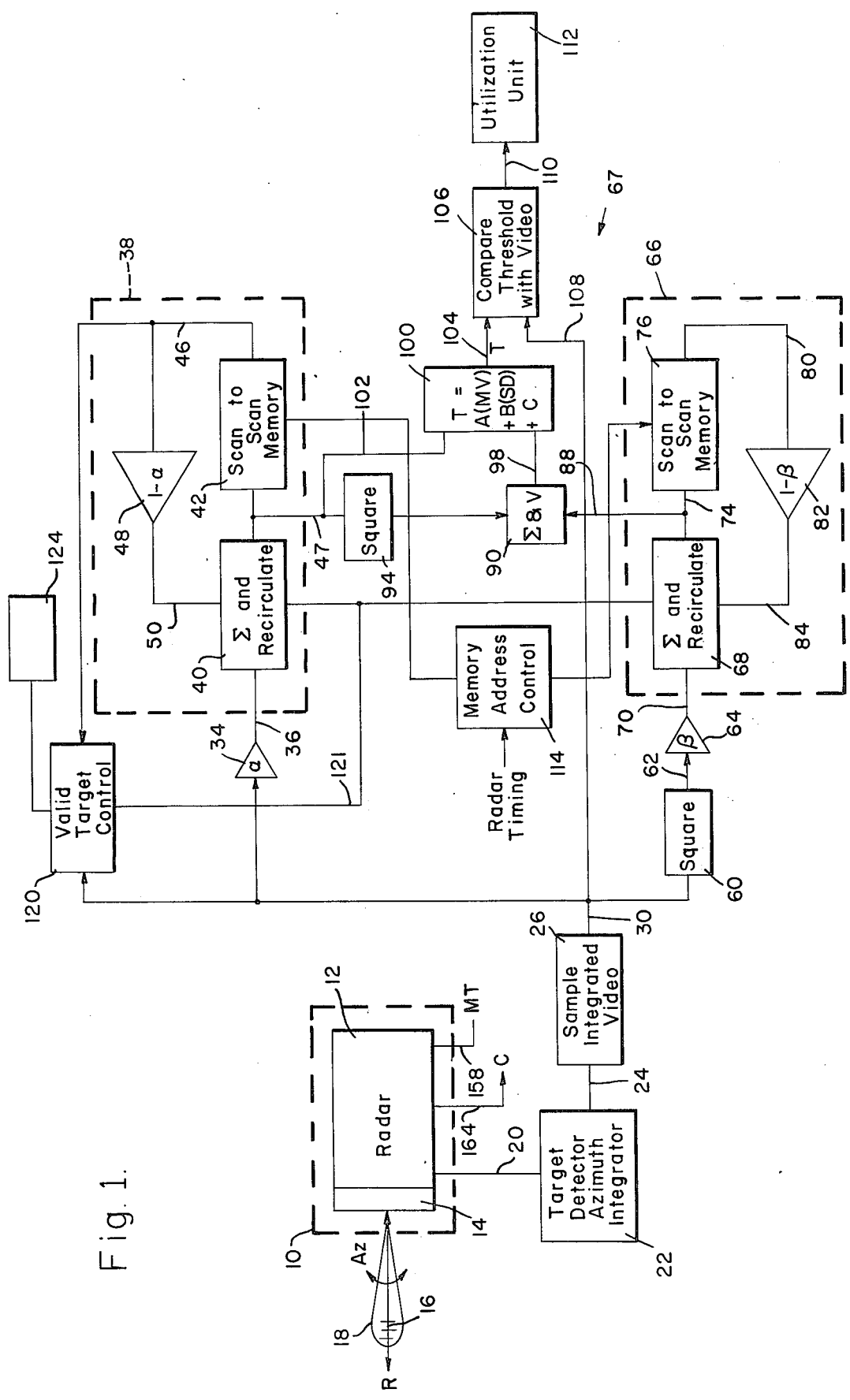
FIG. 1 is a schematic block diagram of the time sampling adaptive clutter processor in accordance with the principles of the invention.

Referring first to FIG. 1, the improved processor in accordance with the principles of the invention may receive quantized video data from a suitable source 10 which may be a radar system, laser transmitting and receiving system, sonar system or a passive system such as an infrared system. For purposes of illustration the processor is shown operating with a radar system 12 which for example may transmit pulses from an antenna 14 into space at a number of different azimuth positions with each transmitted pulse or sweep including a plurality of range bin intervals such as 16 and a plurality of azimuth positions define a plurality of sweeps within the beam 18. The return energy received by the radar system 12 is then processed and quantized in a suitable A to D (analog to digital) converter and the video is applied through a composite lead 20 in digital form to a suitable target detector azimuth integrator 22. Azimuth integration may be utilized so that during each PRF interval, the video is accumulated for each range bin and is continually summed over an azimuth interval for each range bin interval, with the azimuth interval for example including 10 sweeps. It is to be understood that the principles of the invention are not to be limited to azimuth integration such as for example in a system where a sufficiently large memory is provided so as to not require integration in azimuth or in a single pulse radar system in which only a single pulse is transmitted during each beam width. The azimuth integrated signal is then applied through a composite lead 24 to a sampling circuit 26. For a single pulse radar system which has one sweep in azimuth for each beam width, the sample may be selected for each range bin by the circuit 26 by integrating the pulse width. In a radar system in which the azimuth integration area is one interval or one pulse width by one beam width, with the beam width including a plurality of transmitted pulses or sweeps such as 10 sweeps in azimuth, the circuit 26 may select for each range bin, the maximum value of the integrator during the beam width, make one sample during the beam width or take the average of the integrator during the beam width. Although the concepts of the invention include operation with any of these variations, the illustrated arrangement makes one sample during the beam width to determine the integrated video value for each azimuth interval. The selected signal is then applied from the circuit 26 through a composite lead 30 and in turn through an $\alpha$ multiplier 34 to a composite lead 36 where the signal is applied to a mean level processor unit 38. The mean level processor 38 may be a conventional type of mean level processor circuit except for its summing the signals from scan to scan on a time basis or may be a recursive type filter as illustrated including a summation and recirculation circuit 40 responsive to the signal on the lead 36 and in turn coupled to a scan to scan memory 42. The recursive filter develops a smoothed mean value for each quantum area for which a detection threshold is being determined. The stored or old value is applied from the memory 42 through a composite lead 46 and through a $(1-\alpha)$ amplifier 48 to a composite lead 50 which is coupled to the summation and recirculation circuit 40.

The signal on the lead 30 is also applied through a squaring circuit 60 to a composite lead 62 and in turn through a $\beta$ multipling circuit 64 to a mean square generating circuit 66 of a standard deviation unit 67. The circuit 66 may store the data for each quantum area over a desired number of scans such as 16 for example. The illustrated arrangement of the standard deviation generating circuit includes a summation and recirculation circuit 68 responsive to the signal applied from $\beta$ circuit 64 through a composite lead 70. A summed or recirculated signal is applied from the circuit 68 to composite lead 74 to a scan to scan memory 76 from which the stored or old accumulated value is applied through a composite lead 80 and $1-\beta$ multiplier 82 to the circuit 68 through a composite lead 84. The illustrated mean square processor 66 operates as a recursive filter to provide a mean square signal $\overline{Y^2}$ which is applied through a composite lead 88 to a summation and square root circuit 90. The mean value $\overline{Y}$ is applied from the mean level unit 38 through a composite lead 47 to a squaring circuit 94 which in turn applies the value $[\overline{Y}]^2$ to the circuit 90 to generate the standard deviation on a composite lead 98. The standard deviation $SD = \{\overline{Y^2} - [\overline{Y}]^2\}^{\frac{1}{2}}$. A threshold circuit 100 receives the mean value on a composite lead 102 from the lead 47 and the standard deviation on the lead 98 to develop a threshold T equal to A times the mean value + B times the standard deviation + C where C is a selected offset value. The threshold signal T is then applied on a composite lead 104 to a comparison circuit 106 where the signal is compared with the on time video received on a composite lead 108 from the lead 30. The detected target signal is then applied from the comparison circuit 106 through a composite lead 110 to a suitable utilization circuit 112 which for example may be a signal processor or a display unit or may be both.

The scan to scan memories 42 and 76 are controlled by a suitable memory address control or timing unit 114 in response to radar azimuth and range control signals from the radar unit 12. In order to prevent averaging in the amplitude value of targets or of very high amplitude returns and erroneously setting the wrong threshold, a valid target control unit 120 is provided responsive to the accumulated mean target value on the lead 46 and the on-target value on lead 30 to control recirculation in the circuit 40 and 68 and recirculate the old value without summing it with the received video during the presence of a target. The valid target control circuit 120 may be a comparison circuit in which the new data is compared with the time average data, may be a feedback from a tracking computer as is well known in the art or may be a source of a manual signal. In the illustrated system, a comparison circuit is utilized in which in order to prevent strong valid targets from affecting the threshold any integrated video that exceeds the detection threshold by more than a selectable value K from a selection unit 124 is inhibited from affecting the time integrated value during the scans that the target is present.

Figure 2:
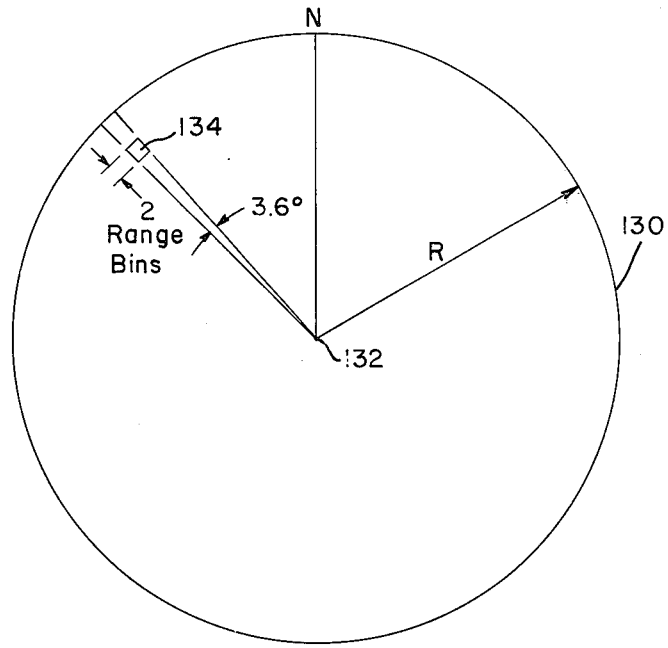
FIG. 2 is a schematic diagram showing the area in space which may be covered during each radar scan for explaining the area of clutter mapping cells that may be utilized for clutter detection and target threshold generation.

Referring not to FIG. 2 which shows the clutter map area in a circle 130 in accordance with the invention from a point 132 which is the location of the surveillance radar system, the entire area is divided up into quantum areas or area clutter map (ACM) cells such as 134 each having a dimension of a selected number of degrees in azimuth in a selected range interval which in the illustrated system is two range bins.

Figure 3:
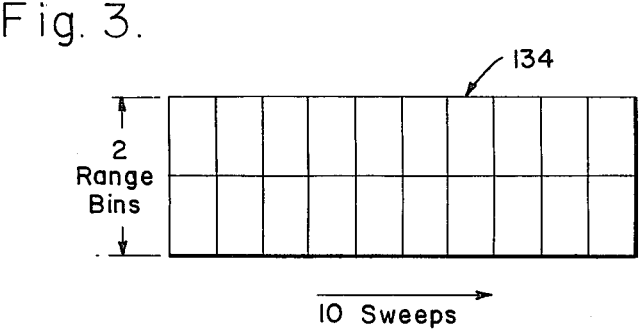
FIG. 3 is a schematic diagram showing the sweeps and the range bins that may be included in a quantum area.

Referring now also to FIG. 3 which shows a typical ACM cell 134 including two range bins in the range dimension and 10 sweeps in the azimuth dimension. It is to be understood that the size of the quantum area may be any selected size and the invention is not to be limited to any particular size quantum area and, for example, in a single pulse system may include a single range bin in the range dimension and a single azimuth sweep in the azimuth dimension.

Figure 4:
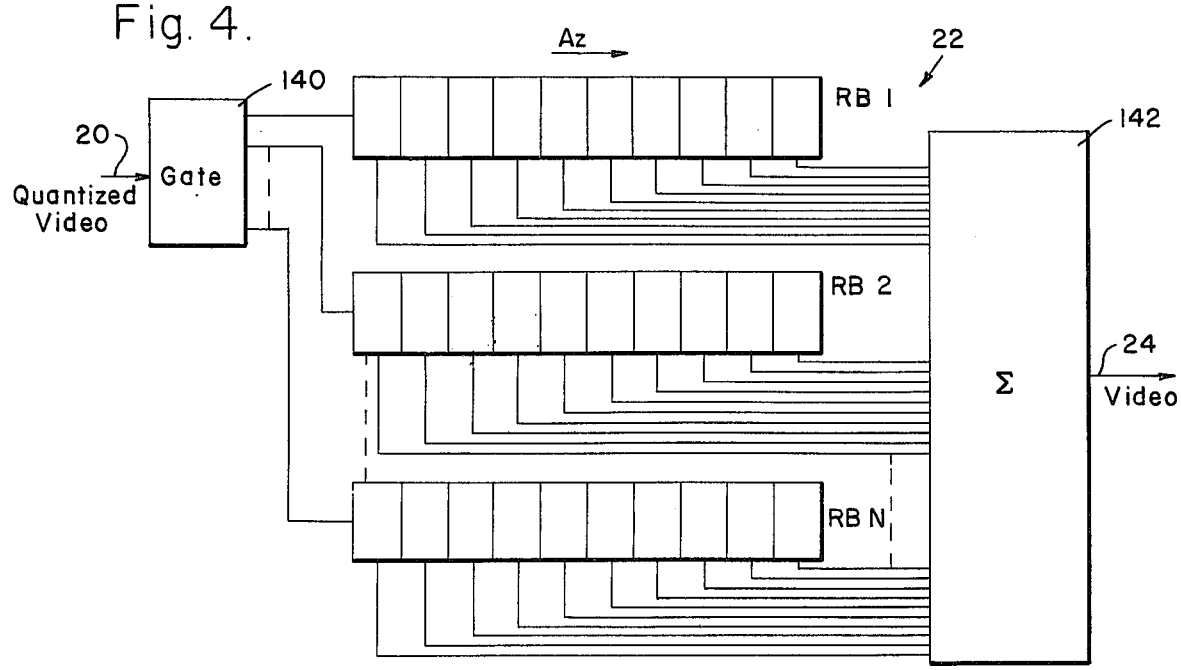
FIG. 4 is a schematic diagram for explaining the azimuth integration that may be utilized in the system of FIG. 1.

Referring now to FIG. 4 the azimuth integrator 22 is illustrated as including a plurality of shift registers labeled RB No. 1, No. 2 and RB No. N with each shift register including 10 azimuth positions for storing the multi-bit data for that range bin. The gating circuit 140 is controlled to respond to the quantized video and during each sweep to apply the data from the corresponding range bin in space to the corresponding shift register. The values for each range bin are then sequentially summed in a summer 142 to provide for each range bin a summed value from 10 sweeps which is applied to the output composite lead 24 in range bin sequence. Azimuth integration is well known in the art and will not be explained in further detail.

Figure 5:
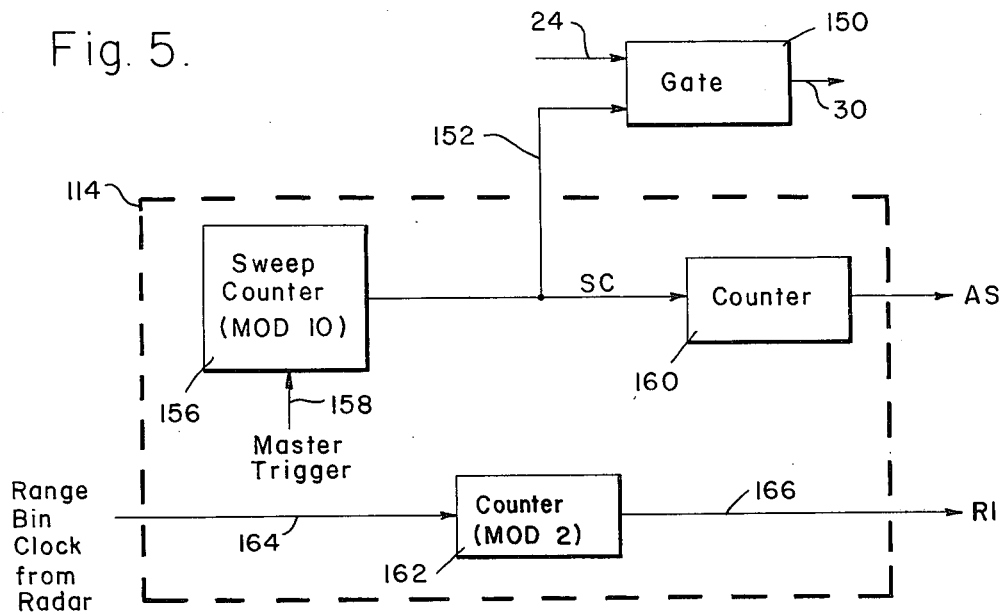
FIG. 5 is a schematic block diagram for explaining the integrated video sampling and the timing in the system of FIG. 1.

Referring now to FIG. 5 the integrated video sampling circuit 26 may include a gate 150, in an arrangement utilizing sampling during each range sweep, responsive to the azimuth integrator video on a lead 24 and to a scan count signal SC applied from the memory address control 114 through a lead 152 to provide a sample video signal every range bin for each tenth sweep to the output lead 30. The memory address control unit 114 includes a mod 10 sweep counter 156 responsive to a master trigger MT signal on a lead 158 from the radar system 12 to develop the pulse SC each tenth sweep which signal is in turn applied to a mod 100 counter 160 which develops a signal AS representing the azimuth sector of 3.6° with 100 sectors covering 360°. A mod 2 counter 162 in response to the range bin clock signal on a lead 164 develops a range interval signal RI on a lead 166 which signal corresponds to the two range bins of the quantum area in the illustrated system.

Figure 6:
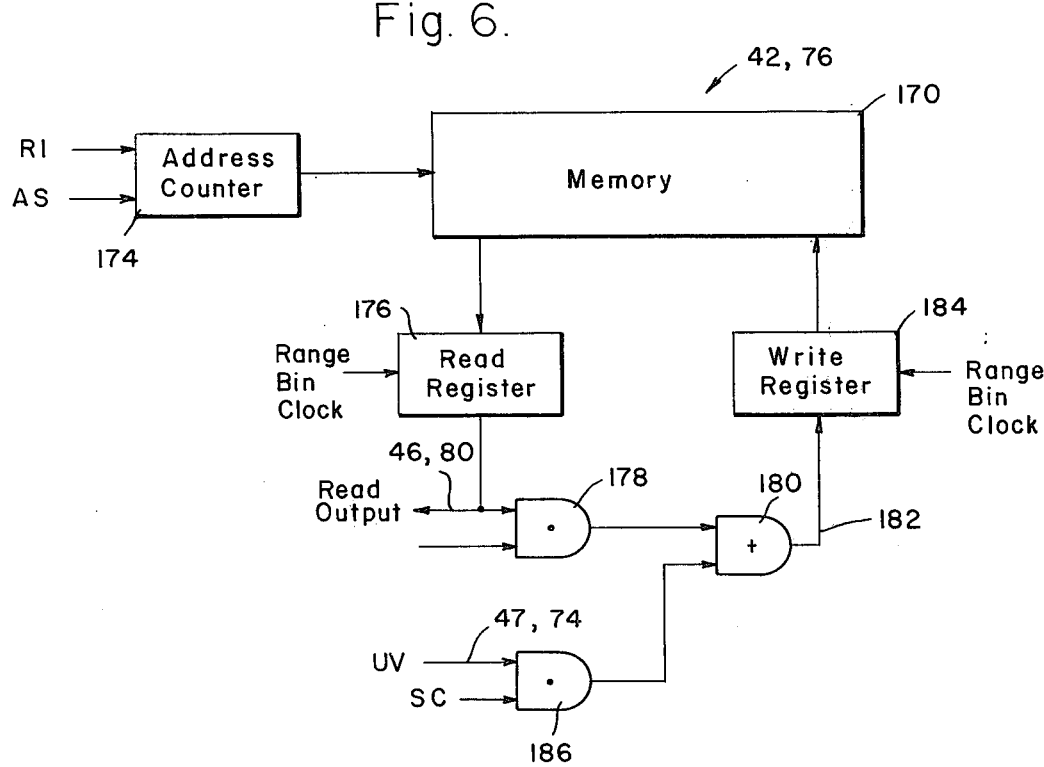
FIG. 6 is a schematic block diagram for explaining the read write operation of the memories that may be utilized in the system of FIG. 1.

Referring now to FIG. 6 the memories 42 and 76 may include a memory storage unit 170 which may be any suitable type of storage such as a magnetic unit or a unit with integrated circuitry storage elements illustrated as an addressable type memory. The range interval (RI) signals and the azimuth sector (AS) signals are applied to an address counter 174 to change the memory address each second range interval at the time of each tenth azimuth sweep. A read register 176 responds to the range bin clock C to read the stored video for each range bin to the output leads 46 or 80 and to apply the video signal to an AND gate 178 which controls recirculation in response to the signal $\overline{SC}$ to apply the video signal through an OR gate 180 and a lead 182 to a write register 184 as the range interval signal RI. The write register 184 controls the memory 170 to write the data back into the proper position every range bin interval. Although other arrangements may be utilized, the illustrated memory reads out data from a quantum area position each range bin time and recirculates it back into the memory at each range bin. For recording a new updated value of video (UV) an AND gate 186 responds to the video signal and the signal SC to apply the video value through the OR gate 180 to the write register 184 to be written therein for each range bin interval with the last range bin in the ACM quantum area providing the data that is stored in the memory. The updated video UV is received from the summation and recirculation circuit 40 or 68 through the leads 47 or 74 and represents the summed video.

Figure 7:
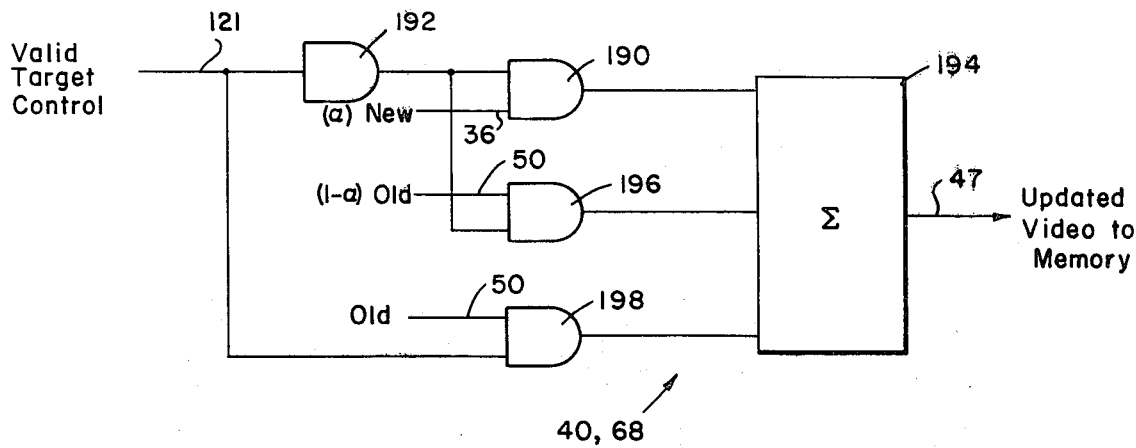
FIG. 7 is a schematic diagram for further explaining the valid target control in the memories of FIG. 1.

Referring now to FIG. 7 the summation and recirculation circuits 40 and 68 which are similar, will be explained relative to circuit 40 including an AND gate 190 receiving the new data on the lead 36 which in combination with the absence of a valid target control signal as provided by an inverter 192 responding to the signal on the lead 121, applies the new data to a summer 194 which combines the old data on the lead 50 with the new data to apply updated video signals UV to the lead 47. An AND gate 198 responds to the valid target control signal on the lead 121 and the old data on the lead 50 to provide recirculation in the presence of a target and to apply the recirculated video value to the lead 47.

Figure 8:
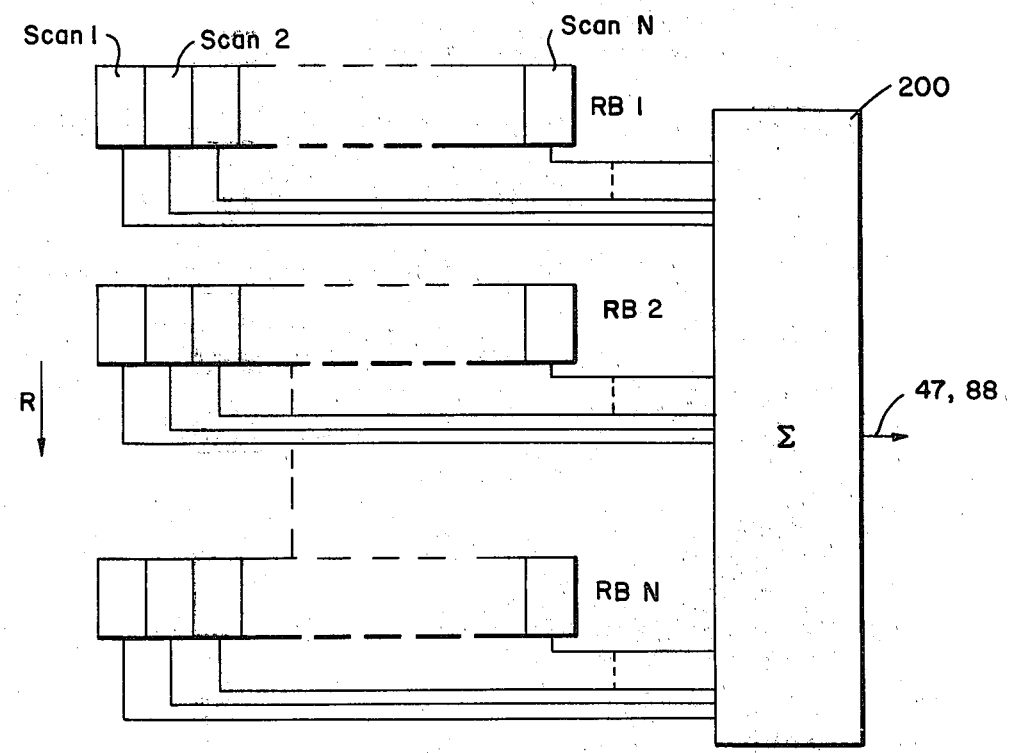
FIG. 8 is a schematic diagram for explaining an alternate mean level and standard deviation detector arrangement in accordance with the invention.

In order to illustrate that the mean level circuit 38 and the mean squared circuit 66 may be of a type storing a plurality of values for each quantum area, reference is made to FIG. 8 which shows a plurality of quantum areas, each containing 1 range bin, with the quantum areas being RB No. 1, RB No. 2 and RB No. N each storing a video value from a different scan with the output from each range bin register being summed in a summer 200 to provide the mean value or the mean square value on the leads 47 and 48. The principles of the invention are equally applicable to the illustrated recursive filtering arrangement shown in FIG. 1 or to the individual scan storage arrangement shown in FIG. 8, the latter having the disadvantage of requiring a substantially larger capacity in the memory.

Figure 9:
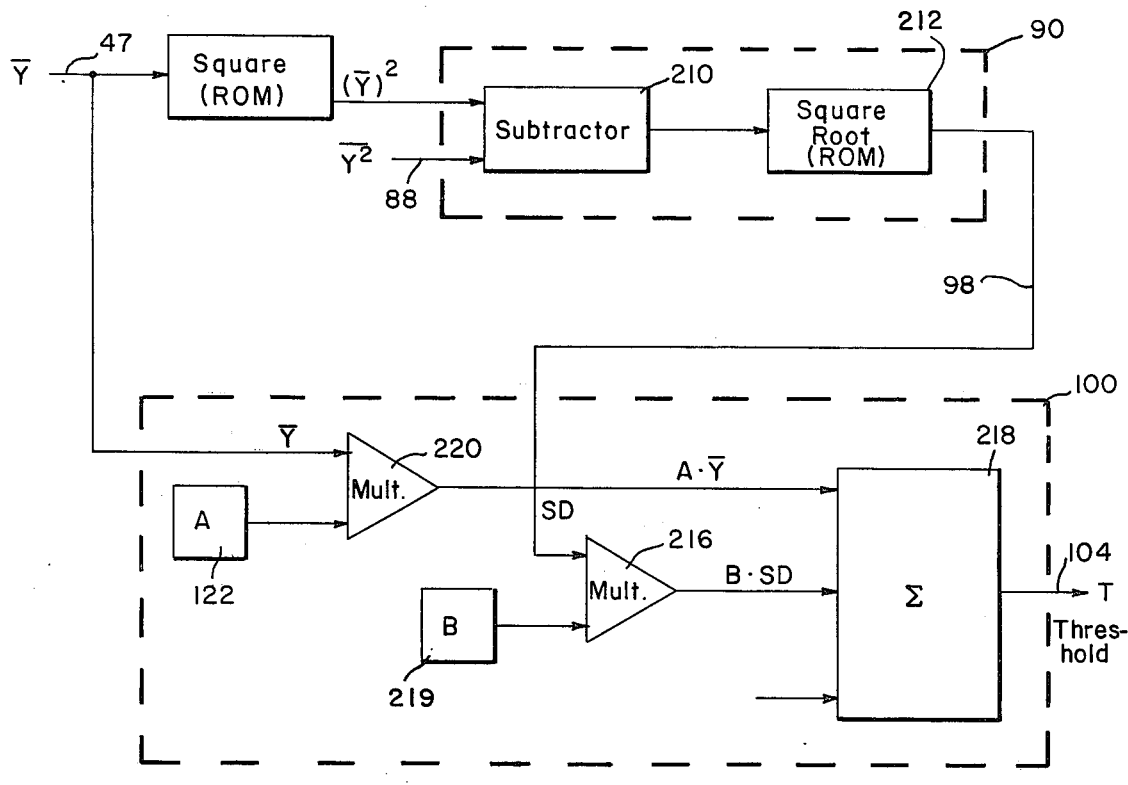
FIG. 9 is a schematic block diagram for further explaining the threshold generation in the system of FIG. 1.

Referring now to FIG. 9 the square of the mean value $[\overline{Y}]^2$ and the mean squared $\overline{Y^2}$ on the lead 88 are applied to a substractor 210 and in turn to a square root circuit 212 which for example may be a read only memory (ROM) included in the circuit 90. The standard deviation SD signal on the lead 98 is applied to a multiplier 216 in the threshold circuit 100 with the multiplier 216 receiving a constant B from a controllable source 219 to apply the signal BSD to a summer 218. A multiplier 220 receives the mean value $\overline{Y}$ on the lead 47 as well as a constant A from a controllable source 122 to apply the signal A $\overline{Y}$ to the summer 218 which in combination with an offset value C develops the threshold signal T on the lead 104. Typically values of the constants for at least one radar condition is $A = 1.1, B = 2.5$ and $C = 14$.

Figure 10:
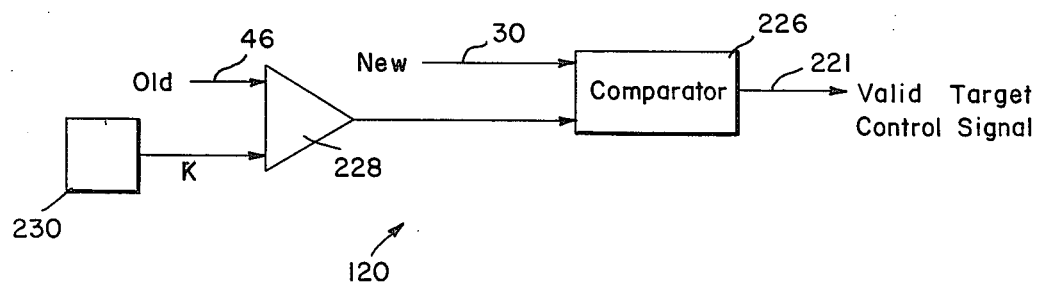
FIG. 10 is a schematic block diagram for explaining one illustrated arrangement to develop a valid target control signal in the system of FIG. 1.

Referring now to FIG. 10, one illustrated arrangement for the valid target control unit 120 includes a comparator 26 receiving the new value of the video from the lead 30 and a multiple of the old, smooth value of the video from the multiplier 228 in turn responding to video on the lead 46 and a selected multiplier constant K from a controllable source 230. A valid target control signal on the lead 121 results when a comparison of the new data with a time average data indicates that the new data is larger than the old, time average data by the constant K representing the presence of a strong target or strong return signal. The valid target control feature of the invention acts to maintain a threshold value that is relatively insensitive to very high amplitude target returns.

The time averager system, in accordance with the principles of the invention, when operating in a ground clutter environment, provides from three to 15 decimals improved sensitivity over other arrangements operating in ground clutter. In general the time averager of the invention will be more efficient than the conventional range averager for clutter with less variation from scan to scan than it has from range bin to range bin. This improvement is provided because most ground clutter has relatively large amplitude variations from range bin to range bin. Although the system of the invention has been illustrated in FIG. 1 as including the mean and the sample deviation or the second moment it is to be understood that the principles of the invention are equally applicable to a system utilizing the mean and the second, third or fourth moments or any combinations thereof.

Thus, there has been described an improved clutter processor for the detection of radar targets such as in non-homogeneous ground clutter by using an adaptive threshold based on time samples instead of space samples. Because most ground clutter has large variations from range bin to range bin the time averager produces much more effective clutter processing than the range averager to a substantial improvement in sensitivity over that of conventional arrangements. The resolution element size in the systems of the invention is dependent upon radar and extractor parameters and is not to be limited to any particular quantum area. In one arrangement in accordance with the invention a recursive filter is utilized to estimate the means and the mean squared value by performing a scan to scan correlation weighted filtering function. The standard deviation is obtained from the mean squared value minus the mean value squared, all to the ½ power and the threshold is obtained by combining the mean value and the standard deviation, each being multiplied by a selected constant, the combined value being added to an offset value. Another feature of system in accordance with the invention is a valid target control concept that minimizes the detrimental effect to the threshold of the presence of strong signals such as targets.

What is claimed is:

1. A target detector system responsive to a source of signals over a plurality of range intervals of a plurality of range sweeps comprising:
   mean level processor means coupled to said source of signals for providing mean values derived from time samples of scan to scan signals,
   standard deviation processor means coupled to said source of signals for providing standard deviation values derived from time samples of scan to scan signals; and
   combining means coupled to said mean level processor means and said standard deviation processor means for providing a target detection threshold.

2. The combination of claim 1 in which said mean level processor means and said standard deviation processor means develop said respective mean values and standard deviation values from quantum areas each of a selected number of range bins and range sweeps and further including valid target control means responsive to said source of signals for inhibiting the signals from said source during the presence of a target return signal.

3. The combination of claim 2 in which said mean level processor means includes a recursive filter and said standard deviation processor means includes a recursive filter.

4. The combination of claim 3 in which the recursive filter in said standard deviation processor means provides a mean square signal, said standard deviation processor means further including squaring means coupled to the recursive filter of said mean level processor means for providing a square of the mean signal, and combining means responsive to said means square signal and said square of the mean signal for developing said standard deviation signal.

5. The combination of claim 1 in which said source of signals includes an azimuth integrator and means for sampling a selected signal value for application to said mean level processor means and to said standard deviation processor means.

6. A signal threshold generating system comprising:
   a source of video signals each representative of energy received from a range bin interval and a selected number of azimuth intervals,
   a first recursive filter coupled to said source for providing a mean value,
   first squaring means coupled to said source,
   a second recursive filter coupled to said squaring means,
   second squaring means coupled to said first recursive filter,
   combining means coupled to said second squaring means and to said second recursive filter for providing a standard deviation value; and
   summing means coupled to said first recursive filter and to said combining means for providing a threshold signal.

7. The combination of claim 6 in which said recursive filters each including summing means and a memory with said summing means coupled to said source of video signals and said summing means coupled to said memory for combining the time sampled video signals to accumulate smooth, time averaged values for quantum areas in space, each quantum area being representative of an area of a selected number of azimuth intervals.

8. The combination of claim 7 in which recirculation means is included in each recursive filter and further including valid target means for detecting the presence of a target and coupled to said recirculating means for recirculating the accumulated values without being combined with the video signals from said source during the presence of a target.

9. The combination of claim 8 including azimuth integrator means and maximum signal selection means respectively coupled between said source and said first recursive filter and said first squaring means.

10. A target detecting system for generating a threshold signal in response to a source of video signals derived from a plurality of azimuth sweeps over a plurality of range bins comprising:
    first means including a mean level processor for providing a mean value and at least one higher order moment value from time samples,
    summing means coupled to said first means for receiving said mean value and at least one higher order moment value to provide a threshold value; and
    comparator means coupled to said source of video signals and to said summing means for developing a detected target signal.

* * * * *